United States Patent [19]

Humbert, Jr. et al.

[11] 4,129,429

[45] Dec. 12, 1978

[54] DUAL ELEMENT AIR FILTER

[75] Inventors: Kingsley E. Humbert, Jr., Gastonia, N.C.; Lewis J. Judah, Meeker, Okla.

[73] Assignee: Wix Corporation, Gastonia, N.C.

[21] Appl. No.: 811,594

[22] Filed: Jun. 30, 1977

[51] Int. Cl.² ............................................. B01D 46/02
[52] U.S. Cl. ...................................... 55/484; 55/499; 55/521; 210/493 M
[58] Field of Search .................. 55/483, 484, 497–499, 55/500, 521, 502, 504; 210/493 M

[56] References Cited

U.S. PATENT DOCUMENTS

| | | | |
|---|---|---|---|
| 3,402,531 | 9/1968 | Farr | 55/521 |
| 3,458,977 | 8/1969 | Young et al. | 55/490 |
| 3,641,744 | 2/1972 | Culbert et al. | 55/521 |
| 3,802,169 | 4/1974 | Musford | 55/521 |
| 3,830,042 | 8/1974 | MacDonnell | 55/497 |

FOREIGN PATENT DOCUMENTS

| | | | |
|---|---|---|---|
| 1275496 | 10/1961 | France | 55/484 |
| 880427 | 10/1961 | United Kingdom | 55/521 |

*Primary Examiner*—Bernard Nozick
*Attorney, Agent, or Firm*—Shoemaker and Mattare, Ltd.

[57] ABSTRACT

An air filter for filtering particulate matter from air flowing therethrough to a point of use requiring clean air, includes an imperforate front wall, a perforate back wall and opposite, imperforate side walls. The front wall is smaller in height than the back wall and a pair of pleated filter elements extend from the top of the front wall to the top of the back wall and from the bottom of the front wall to the bottom of the back wall, respectively, defining a wedge-shaped outlet space between the filter elements extending from the front wall to the back wall and being larger toward the back wall. A plurality of the filters are adapted to be stacked one on top of the other to define a plurality of inlet spaces therebetween and a plurality of outlet spaces. Reinforcing members are interposed between the filter elements in each filter, whereby the filter is enabled to support the weight of a man thereon. The filter is thus simple and rugged in construction and provides a large filtration area in a minimum amount of space.

8 Claims, 5 Drawing Figures

DUAL ELEMENT AIR FILTER

BACKGROUND OF THE INVENTION

This invention relates in general to air filters, and more particularly to an air filter for use on an apparatus wherein the amount of available space for the filter is limited. Moreover, the filter of the present invention must be strong in construction and should preferably be capable of supporting the weight of a man thereon. Additionally, the filter should be simple in construction, such that it is economical to manufacture.

Filters of the type with which the present invention is concerned are disclosed in U.S. Pat. Nos. 3,402,531 and 3,802,169, for example. In U.S. Pat. No. 3,402,531 a plurality of filter elements are adapted to be arranged in stacked relationship to provide a maximum filtration area in a minimum space for supply of filtered air to a locomotive diesel engine or the like. U.S. Pat. No. 3,802,169 and applicants' co-pending application Ser. No. 791,468, filed Apr. 27, 1977, disclose arrangements wherein a single filter element is positioned to filter air supplied to an engine or the like.

The tapered dual element filter of the present invention is capable of use in either of the environments in U.S. Pat. Nos. 3,402,531 and 3,802,169, and when used as a single filter element on a truck engine, for example, is of sufficient strength and ruggedness to support the weight of a man thereon. For example, during service on heavy machinery and equipment such as trucks and the like, mechanics frequently step on top of the air filter, and the filter must thus not only be capable of efficiently filtering air supplied to the engine, but must also be capable of supporting the weight of the man. Alternatively, when a plurality of the filters according to the invention are stacked one upon the other and used in an environment such as in U.S. Pat. No. 3,402,531, a simple and efficient filter structure is obtained which has a relatively large open area for minimum impedance to flow of air therethrough.

The prior art filters, while serving the purpose for which they are designed, do not possess the economy of construction and strength along with the necessary large filtration area in a minimum amount of space as provided by the present invention.

OBJECTS OF THE INVENTION

Accordingly, it is an object of this invention to provide an air filter which is economical in construction and yet which possesses a high degree of strength and presents a large filtration area in a minimum amount of space.

Another object of the invention is to provide a paper filter member which has dual filter elements therein defining a generally wedge-shaped outlet space and which filter is capable of use either singly or in multiple, stacked relationship, and wherein the filter possesses sufficient strength to support the weight of a man thereon.

A further object of the invention is to provide a dual element paper air filter which is simple and economical in construction and which has sufficient strength to support the weight of a man thereon and at the same time provides maximum filtration area in a minimum amount of space and which presents minimum impedance to flow of air therethrough.

DETAILED DESCRIPTION OF THE INVENTION

Figure 1:
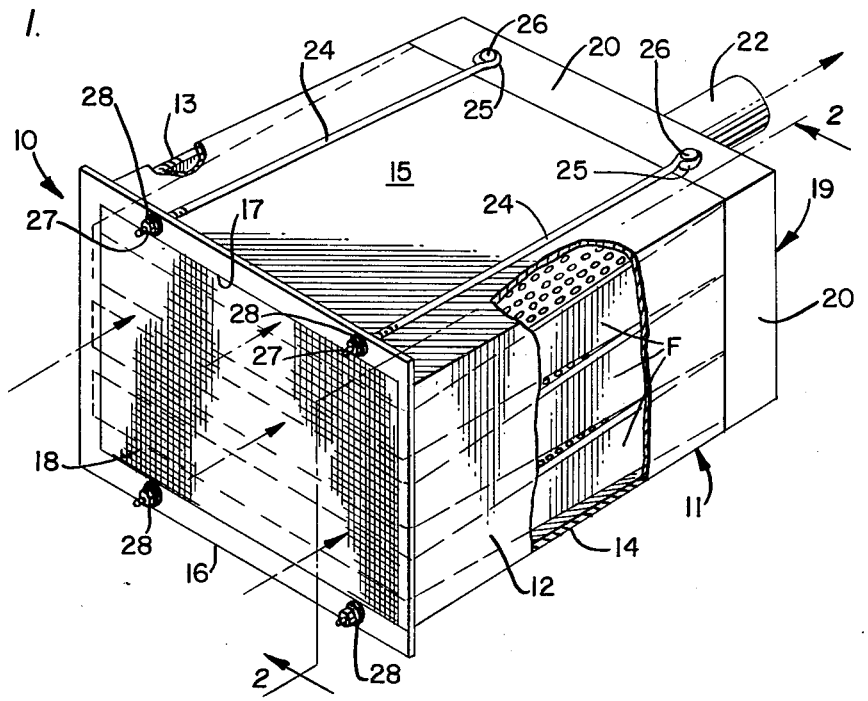
FIG. 1 is a top perspective view with portions broken away of an arrangement wherein a plurality of filters according to the invention are assembled in stacked relationship.
Figure 2:
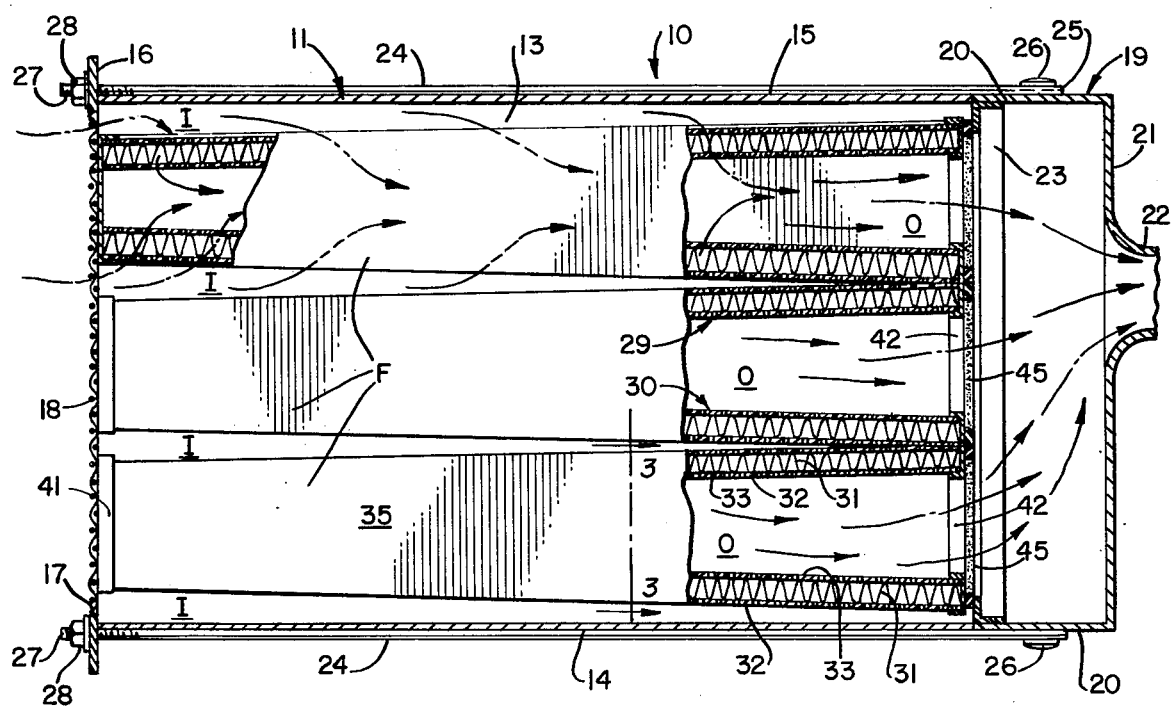
FIG. 2 is an enlarged view in section with portions broken away taken along line 2—2 in FIG. 1.

In the drawings, wherein like reference numerals indicate like parts throughout the several views, a filter assembly in accordance with a preferred form of the invention is indicated generally at 10 in FIGS. 1 and 2, and comprises a filter frame or housing 11 having opposite side walls 12 and 13, bottom wall 14 and top wall 15. A peripheral, laterally outwardly projecting flange 16 is on the forward end of the walls and circumscribes or defines a rectangularly shaped inlet opening 17 on the forward end of the housing. A suitable mesh screen 18 is secured in the opening 17 for filtering or screening large particulate material from air flowing therethrough. An outlet housing or plenum chamber 19 is secured at the other or downstream end of the assembly 10 and comprises a peripheral side wall 20 and an end wall 21 with an outlet opening 22 therethrough. An internal, peripheral, angle flange 23 is secured in the plenum chamber 19 adjacent the forward end thereof for abutting engagement with the outlet ends of a plurality of filters F stacked in the housing 11 of assembly 10.

The housing, and thus the filters F, are held in assembled relationship by means of a plurality of longitudinally extending tie rods or bolts 24 having suitable configurations such as eyes 25 at one end thereof for engagement over pins or studs 26 on the plenum chamber, and having threaded ends 27 at their other end extending through openings in the flange 16 at the inlet end of the assembly. Nuts 28 are threaded on the threaded ends for retaining the assembly in assembled relationship.

The filters F are identical to one another and each comprises a pair of filter elements 29 and 30 constructed substantially as shown in FIG. 8 of U.S. Pat. No. 3,458,977, and each including a pleated paper filter material 31 having first and second perforated sheets 32 and 33 adhesively secured on the opposite sides of the corrugated filter media 31. The filter elements 29 and 30 are supported in a housing or frame construction including opposite side walls or panels 34 and 35 formed of sheet metal or the like and having a substantially channel-shape in transverse cross-section. Additionally, the side panels 34 and 35 taper in width from one end to the other end, being narrower in width toward the inlet end of the assembly, or toward the left-hand end as viewed in FIG. 2, for example.

A pair of reinforcing and spacing channels 36 and 37 are positioned between the filter elements 29 and 30 at the opposite side edges thereof in closely spaced parallel relationship with the side walls 34 and 35, respectively, and a layer of adhesive or mastic or the like 38 and 39 is interposed between the reinforcing and spacing channels 36 and 37 and the side walls 34 and 35. A further reinforcing channel and spacer 40 of substantially identical construction to the channels 36 and 37 is interposed between the filter elements 29 and 30 substantially midway of the opposite sides thereof for providing additional support to the filter elements whereby it is insured that the filter will support the weight of a man thereon. A layer of adhesive or mastic or the like is interposed between the side edges of the channels 36, 37 and 40 and the adjacent surfaces of the filter elements 29 and 30. An imperforate front wall 41 closes the space between the filter elements 29 and 30 at the inlet end thereof and has a narrow peripheral flange thereon engaged over the outside of the side walls 34 and 35 and the end surface portions of the filter elements 29 and 30. This inlet end wall 41 is also secured to the filter by means of an adhesive or mastic or the like. The outlet end of the filter has an outlet end wall 42 thereon with a narrow peripheral flange secured to the outlet ends of the filter elements 29 and 30 and the side walls 34 and 35 by means of an adhesive or mastic or the like. Additionally, the outlet end wall 42 has a pair of outlet openings 43 and 44 punched or otherwise suitably formed therein opening over substantially the entire space between the filter elements 29 and 30 at the outlet end thereof, with the exception of the areas occupied by the channel spacers and reinforcing members 36, 37 and 40.

A peripheral sealing gasket 45 is secured to the outer end surface of the outlet end wall 42 by means of a suitable adhesive or mastic or the like for sealing engagement with the flange 23 in plenum chamber 19 when the filters F are held in assembled relationship in the assembly 10, as shown in FIGS. 1 and 2. Additionally, this sealing gasket 45 is arranged to engage a corresponding surface in a housing in which the filter element may be used as a single filtering member, as distinguished from being used in stacked plural relationship as shown in FIGS. 1 and 2.

Note that in the filters F the corrugations or pleats of the filter material 31 in the filter elements 29 and 30 extend transversely of the longitudinal axis of the filters F.

The filters F assembled in stacked relationship as shown in FIG. 2 define a plurality of V-shaped or wedge-shaped inlet spaces I between the filters at the inlet or upstream ends thereof and a plurality of outlet spaces O in the filters at the downstream ends thereof.

Figure 3:
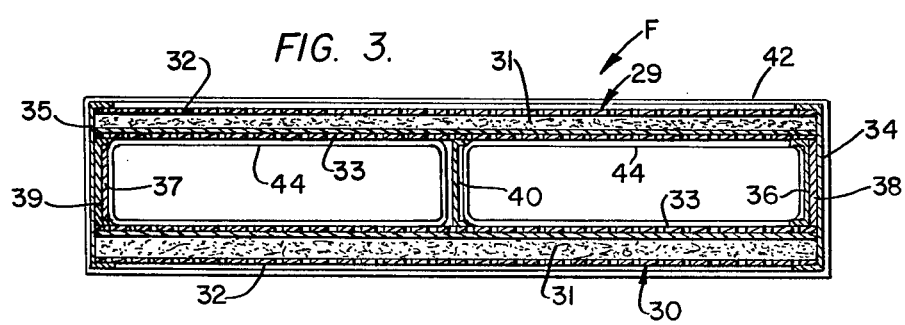
FIG. 3 is a view in section of one of the filters of FIG. 2 and is taken along line 3—3 in FIG. 2.
Figure 4:
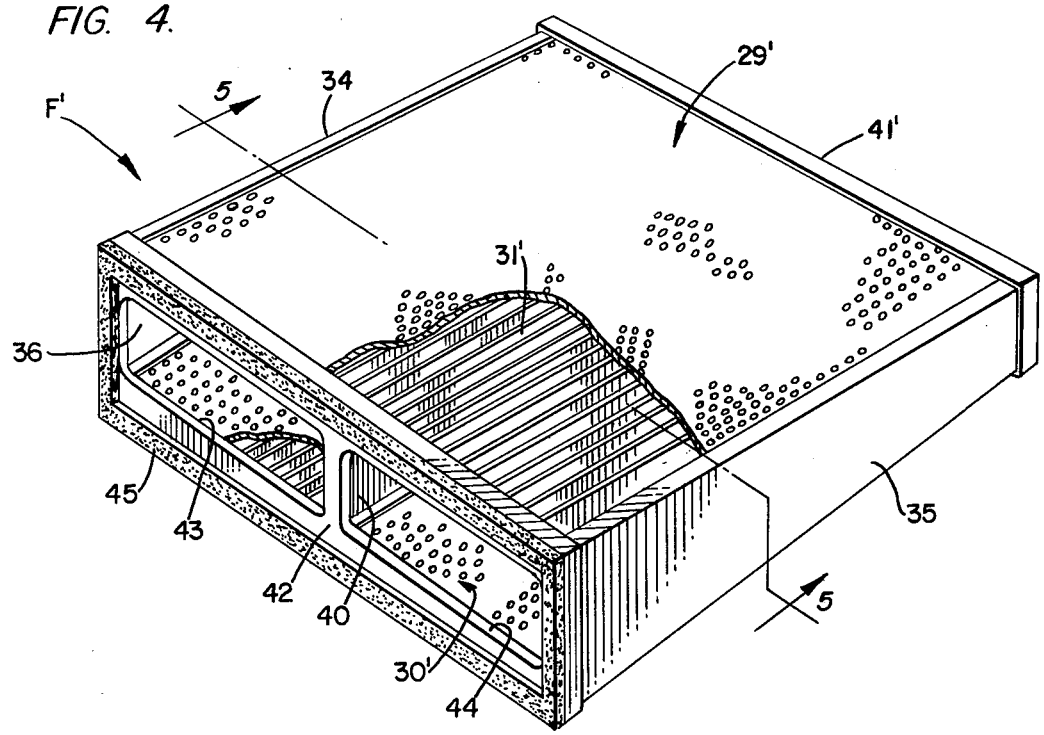
FIG. 4 is a perspective view with portions broken away of a modified filter according to the invention.
Figure 5:
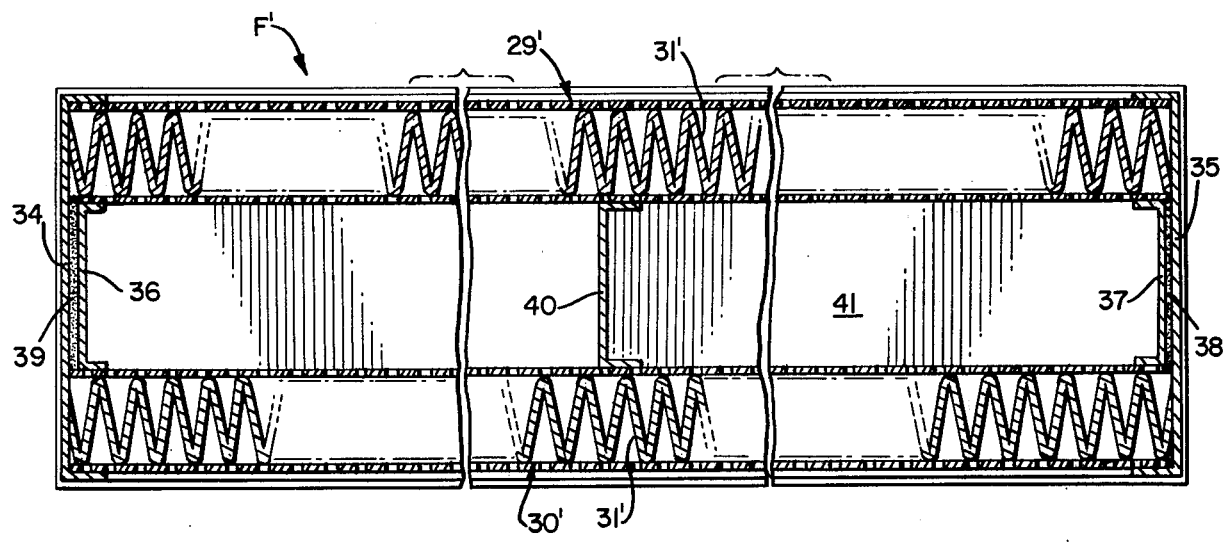
FIG. 5 is a greatly enlarged view in section with portions broken away of the filter of FIG. 4 and taken along line 5—5 in FIG. 4.

A modified filter F' is illustrated in FIGS. 4 and 5 and this form of the filter is identical to the filter F illustrated in FIGS. 1-3 in every respect except for the direction of the pleats or corrugations of the filter material 31 in the filter elements 29 and 30, and in this form of the invention, the pleats of the filter material 31' in the filter elements 29' and 30' extend parallel to the longitudinal axis of the filter F' rather than transversely thereof, as in FIGS. 1-3. With this arrangement a somewhat more efficient flow of air is achieved through the filter.

With the construction thus described, assembly of the filter is quite simple and a high quality product is achieved with good assurance of an effective seal at all joining surfaces. Accordingly, the number of defective filters is kept to a minimum and the cost of the filter can be made low in comparison with prior art filters. Moreover, very large filtration areas are provided in a minimum space with the result that high flow rates can be obtained through the filter.

As this invention may be embodied in several forms without departing from the spirit or essential characteristics thereof, the present embodiment is, therefore, illustrative and not restrictive, since the scope of the invention is defined by the appended claims rather than by the description preceding them, and all changes that fall within the metes and bounds of the claims or that form their functional as well as conjointly cooperative equivalents are, therefore, intended to be embraced by those claims.

We claim:

1. An air filter, comprising: a frame having a pair of channel shaped side walls, each side wall having a web portion and a pair of flanges connected to said web portion, said flanges defining a frame top and a frame bottom, respectively, said top and bottom each having an air inlet opening defined therein and being spaced apart to define a thickness for said frame, said frame further including an imperforate front wall, and a frame back including an end wall having a plurality of air openings defined therein, said front wall and back being spaced apart to define a length for said frame, said air openings in said frame back end wall forming a filter outlet for passing filtered air out of the air filter, said side walls being spaced apart imperforate and extending from the front wall to the frame back at opposite sides of the frame; first and second pleated air filter elements mounted on said frame side wall defining channels, said first filter element being located at said frame top, and said second filter element being located at said frame bottom, extending, respectively, from the top of the front wall to the top of the frame back, and from the bottom of the front wall to the bottom of the frame back, said pleated elements each having a top surface and a bottom surface and a pair of sides with said side wall defining channels being located on the outside of said filter element sides, said pleated filter elements being separate from each other and spaced apart from one another along the entire length thereof and defining an outlet space therebetween communicating with said filter outlet defined in said frame back end wall; perforate cover sheets mounted on each of said pleated element top and bottom surfaces, said perforate cover sheets defining air passages for the air filter for passing air to be filtered from said air inlet openings through said pleated elements and into said outlet space; and a plurality of reinforcing means in the filter between the pleated filter elements, said plurality of reinforcing means including a pair of side reinforcing means each located between said perforate cover sheets and near said filter element sides and said frame side wall defining channel webs and an intermediate reinforcing means located intermediate said filter element sides to support said filter elements near the middles thereof, and adhesive means securing said side reinforcing means to said frame side wall defining channel webs, said reinforcing means contacting the cover sheets of both said filter elements for supporting said filter elements in spaced relation and extending from said front wall to said frame back to contact both said filter elements for the entire length thereof to support said filter elements for the entire length and thickness of said frame thereby strengthening the entire frame sufficiently to enable the air filter to support the weight of a man thereon.

2. A filter as in claim 1, wherein each pleated filter element comprises a pleated paper filter member with the pleats thereof extending parallel to one another and being substantially coplanar at both the top or outer surface and bottom or inner surface of the respective filter elements, said perforate cover sheets being secured on the pleats of the filter elements.

3. A filter as in claim 1, wherein the frame front wall has a smaller height than the frame back, so that the filter is tapered from the front to the back wall thereof, and the top and bottom filter members diverge from one another toward the back of said frame, whereby the outlet space is generally wedge shaped and is larger toward the outlet end.

4. A filter as in claim 3, wherein a plurality of the filters are stacked one on top of the other, with the inlet ends thereof spaced from one another and the outlet ends thereof in abutting, contiguous relationship, thereby defining a plurality of generally wedge shaped, converging inlet spaces between the filters, and a plurality of diverging outlet spaced within the filters.

5. A filter as in claim 3, wherein each pleated filter element comprises a pleated paper filter member with the pleats thereof extending parallel to one another and being substantially coplanar at both the top and bottom of the respective filter elements.

6. A filter as in claim 5, wherein the pleats extend in a direction transverse to the longitudinal axis of the filter.

7. A filter as in claim 5, wherein the pleats extend in a direction parallel to the longitudinal axis of the filter.

8. A filter as in claim 6, wherein the reinforcing means comprise sheet metal members generally channel-shaped in transverse cross section and having longitudinally extending top and bottom flanges.

* * * * *